H. GIBBS.
HOSE NOZZLE.
APPLICATION FILED DEC. 13, 1911.

1,034,101.

Patented July 30, 1912.

Witnesses:

Inventor:
Henry Gibbs,
By Peirce, Fisher & Clapp
Attys.

COLUMBIA PLANOGRAPH CO., WASHINGTON, D. C.

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-NOZZLE.

1,034,101.  Specification of Letters Patent.  Patented July 30, 1912.

Application filed December 13, 1911. Serial No. 665,455.

*To all whom it may concern:*

Be it known that I, HENRY GIBBS, a citizen of the United States, and a resident of Chicago, county of Cook, and State of Illinois, have invented certain new and useful Improvements in Hose-Nozzles, of which I do declare the following to be a full, clear, and exact description, reference being had to the accompanying drawing, forming part of this specification.

The present invention has relation more particularly to that class of hose nozzles in which provision is made whereby the water may be caused to issue from the nozzle, either in a solid stream or more or less in the form of spray.

One object of this invention is to improve a construction of such type of hose nozzle and a further object is to provide a hose nozzle of this type with means whereby the stream of water may be completely shut off by the mere manipulation of the nozzle.

The invention consists in the features of novelty hereinafter described, illustrated in the accompanying drawing and particularly pointed out in the claims at the end of this specification.

Figure 1:
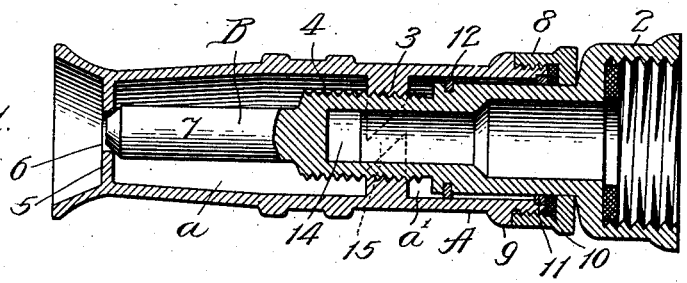
Figure 2:
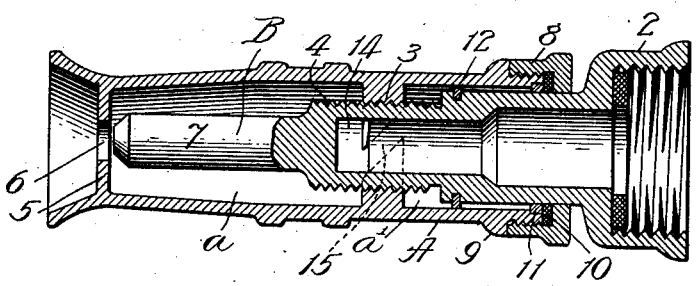
Figure 3:
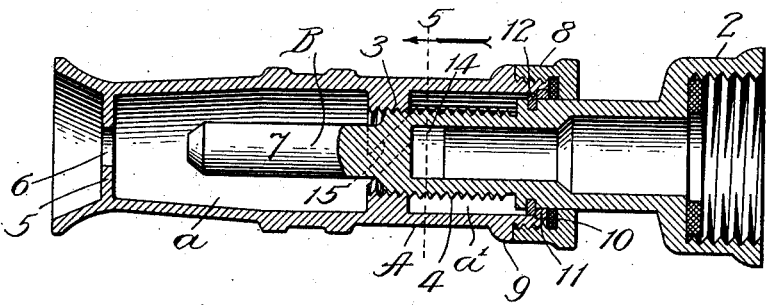
Figure 4:
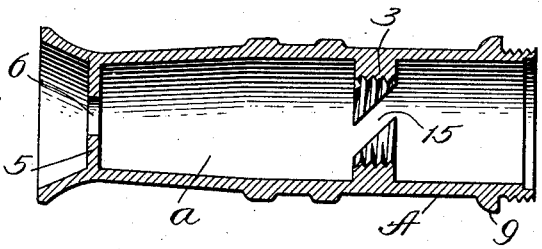
Figure 5:
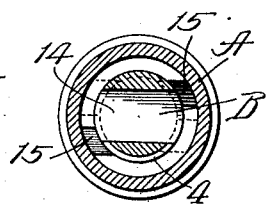

Figure 1 is a view in central longitudinal section through a hose nozzle embodying my invention. Figs. 2 and 3 are views similar to Fig. 1, but shown with the parts in different position. Fig. 4 is a detail view in longitudinal section of the outer shell or member. Fig. 5 is a view in cross section on line 5 of Fig. 3.

In the preferred form of my invention the hose nozzle comprises an outer shell or member A and an inner member B, the inner member being provided at one end with an interiorly screw threaded portion 2 adapted to be coupled to the hose. The outer member A is formed upon its interior with an annular flange 3 that is screw threaded to engage a correspondingly threaded portion 4 of the inner member B. Adjacent its discharge end, the outer member A is shown as formed with an inner flange or diaphragm 5 in which is formed a central opening 6 through which the water will be discharged, and the inner member is provided with a stem or valve 7 adapted to close this discharge port 6. The opposite end of the outer member A is formed with screw threads to receive the correspondingly threaded ring or cap 8 which, when in position for use, will abut against an annular exterior flange 9 on the member A. The cap 8 has a hole therein to receive the cylindrical expanded portion of the inner member B and rings 10 and 11 are preferably arranged, as shown, within the cap 8 to guard against leakage of water through the nozzle. A peripheral groove is formed in the inner member B into which will be sprung a metal ring 12 which will engage with the ring 11 and prevent the complete withdrawal of the inner member B from the outer shell or member A. The inner member B is chambered, as shown, and through the walls of the outer portion of the chamber are formed the discharge ports 14 (one or more) through which water may pass.

The annular interior flange 3 of the outer shell or member A is formed with one or more diagonal grooves 15, the purpose of which is to impart a swirling motion to the water as it passes through the outer portion of the member A and cause it to issue in the form of spray from the discharge orifice 6 of the nozzle.

By reference to Fig. 1, it will be seen that when the parts of the nozzle are in the position there shown, the outer end of the valve or stem 7 will close the discharge orifice 6 and prevent the flow of water through the nozzle. If now, the outer shell A be turned by the hand of the operator upon the inner member B, the threaded engagement of the outer and inner members will cause the parts to be shifted until the parts assume the position shown in Fig. 2. Water will then pass through the chamber of the inner member B and through the discharge ports 14 into the outer chamber $a$ of the shell or member A and thence through the discharge orifice 6, and when the parts are in such position, the water will issue from the orifice 6 in a practically solid stream. If, by turning the outer shell or member A the parts be caused to assume the relative position shown in Fig. 3, the water passing through the chambered member B will issue through the discharge ports 14 into the chamber $a'$ of the outer shell or member A and will be forced thence through the diagonal grooves or channels 15 of the interior flange 3 between the chambers $a$ and $a'$ of the outer member A. As the water is forced through these diagonal channels 15, it will have a swirling motion imparted thereto with the result that it will issue from the discharge orifice 6 at the end of the nozzle in the form of fine spray. In practice it is found that even when the discharge ports 14 are partially within the threaded flange 3, the water will still have a swirling motion imparted thereto and will issue in the form of spray from the discharge end of the nozzle.

My present invention affords an exceedingly simple, cheap and effective form of hose nozzle by which the water can be caused to issue from the nozzle as a solid stream or in the form of spray, or can be completely shut off by the mere manipulation of the nozzle itself.

It is obvious that the precise details of construction may be varied without departing from the spirit of the invention.

Having thus described my invention what I claim as new and desire to secure by Letters Patent, is:—

1. A hose nozzle of the character described comprising an inner and an outer member, said outer member being provided at its end with a discharge orifice and upon its interior at a distance from its discharge end with a diagonally grooved inner flange and said inner member being chambered and provided with one or more discharge ports, said inner and outer members being relatively movable to permit the discharge port of the inner member to be brought into position to coöperate with said diagonally grooved flange for producing a spray and to be moved beyond said diagonally grooved flange to produce a solid stream.

2. A hose nozzle comprising chambered inner and outer members having engaging screw threads and being longitudinally movable relatively one to the other, said outer member having a discharge orifice at its end and an internal flange provided with inclined passages and engaging said inner member, said inner member having one or more lateral discharge ports adapted to be moved past said flange to vary the spray.

3. A hose nozzle of the character described comprising an inner and an outer member, said outer member being provided at its end with a discharge orifice and upon its interior at a distance from its discharge end with a diagonally grooved screw threaded flange and said inner member being screw threaded to engage said flange and being chambered and provided with one or more discharge ports, said inner and outer members being relatively movable to permit the discharge port of the inner member to be brought into position to coöperate with said diagonally grooved flange for producing a spray and to be moved beyond said diagonally grooved flange to produce a solid stream.

4. A hose nozzle of the character described comprising an inner and an outer member, said outer member being provided at its end with a discharge orifice and having its interior formed with two chambers and with an interior screw threaded flange separating said chambers, said flange being diagonally grooved, and said inner member being chambered and provided with one or more discharge ports and being formed with threads to engage the said threaded annular flange whereby the port or ports of said inner chamber may be brought opposite either of the chambers of the outer member.

5. A hose nozzle of the character described comprising an inner and an outer member, said outer member being provided at its end with a discharge orifice, and upon its interior at a distance from said discharge orifice with a diagonally grooved and screw threaded inner flange and said inner member being chambered and exteriorly screw threaded to engage said threaded flange and provided with one or more discharge ports, a stop on said interior member and a cap connected with one end of said outer member and through which said chambered inner member passes.

6. A hose nozzle comprising chambered inner and outer members having engaging screw threads and being relatively movable in longitudinal direction, said outer member having a discharge port at its end and having upon its interior, and at a distance from its discharge end, an internal ported flange, and said inner member having a valve at its outer end adapted to close said discharge orifice and being provided with one or more discharge ports in its side walls adapted to be moved past said flange to vary the spray.

HENRY GIBBS.

Witnesses:
HARRY L. CLAPP,
KATHARINE GERLACH.

Copies of this patent may be obtained for five cents each, by addressing the "Commissioner of Patents, Washington, D. C."